US011805113B2

(12) United States Patent
Chan et al.

(10) Patent No.: US 11,805,113 B2
(45) Date of Patent: *Oct. 31, 2023

(54) ESTABLISHING TRUST WITH NETWORK DEVICE

(71) Applicant: Comcast Cable Communications, LLC, Philadelphia, PA (US)

(72) Inventors: James Chan, San Francisco, CA (US); Weston Schmidt, San Jose, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,708

(22) Filed: Jul. 6, 2022

(65) Prior Publication Data

US 2022/0417235 A1 Dec. 29, 2022

Related U.S. Application Data

(63) Continuation of application No. 16/239,813, filed on Jan. 4, 2019, now Pat. No. 11,411,941.

(51) Int. Cl.
| | | |
|---|---|---|
| *H04L 29/06* | (2006.01) | |
| *H04L 9/40* | (2022.01) | |
| *H04W 76/19* | (2018.01) | |
| *H04L 12/66* | (2006.01) | |
| *H04W 60/00* | (2009.01) | |
| *H04W 88/16* | (2009.01) | |
| *H04W 12/06* | (2021.01) | |
| *H04W 12/60* | (2021.01) | |

(52) U.S. Cl.
CPC .......... *H04L 63/0807* (2013.01); *H04L 12/66* (2013.01); *H04L 63/20* (2013.01); *H04W 12/06* (2013.01); *H04W 12/66* (2021.01); *H04W 60/00* (2013.01); *H04W 76/19* (2018.02); *H04W 88/16* (2013.01)

(58) Field of Classification Search
CPC ..... H04L 63/0807; H04L 12/66; H04L 63/20; H04W 12/06; H04W 12/66; H04W 60/00; H04W 76/19; H04W 88/16; H04W 8/18
See application file for complete search history.

(56) References Cited

U.S. PATENT DOCUMENTS

| | | | |
|---|---|---|---|
| 7,539,193 B2 | 5/2009 | Pfeffer et al. | |
| 11,411,941 B2 * | 8/2022 | Chan | H04L 63/0807 |
| 2006/0064493 A1 * | 3/2006 | Hammell | H04L 63/0815 |
| | | | 709/227 |
| 2016/0301566 A1 | 10/2016 | Ramasubramani et al. | |
| 2017/0078285 A1 | 3/2017 | Lee | |

(Continued)

*Primary Examiner* — Baotran N To
(74) *Attorney, Agent, or Firm* — Banner & Witcoff, Ltd.

(57) ABSTRACT

Systems, apparatuses, and methods are described for establishing, or re-establishing, trust for a network device. A user device may send, via a network device, a service request to establish trust for the network device in a network. The service request may comprise, or may allow look up of, identifying information for the network device, such as a network address. Trust of the network device may be established, at least in part, by confirming the network address (or other identifying information) associated with the network device, and/or by confirming certain devices that are in communication with the network device. An authentication token may be sent to the network device for reconnecting to the network.

24 Claims, 12 Drawing Sheets

(56) References Cited

U.S. PATENT DOCUMENTS

2018/0167812 A1* 6/2018 Nagarajamoorthy ........................ H04B 17/318
2020/0053578 A1 2/2020 Schmidt et al.

* cited by examiner

ESTABLISHING TRUST WITH NETWORK DEVICE

CROSS-REFERENCE TO RELATED APPLICATIONS

This application claims priority to and is a continuation of U.S. application Ser. No. 16/239,813, filed Jan. 4, 2019, which is hereby incorporated by reference in its entirety.

BACKGROUND

A network operator or service provider may provide equipment (e.g., customer premises equipment (CPE), gateways, etc.) that may be connected to the network to provide network access to users. Such devices may store data electronic certificates that are used by the network operator to confirm communications are received from authorized devices. Some CPE devices or gateways, however, may be not have required electronic certificates, or have certificates that are outdated, incomplete, corrupted, or otherwise not trustworthy, and therefore may not allow a user to access a network. These and other shortcomings are addressed by this disclosure.

SUMMARY

The following summary presents a simplified summary of certain features. The summary is not an extensive overview and is not intended to identify key or critical elements.

Systems, apparatuses, and methods are described for establishing, or re-establishing, trust for untrusted devices. A provisioning request may be sent, to a registration entity, to provision or re-provision an untrusted device connected to a network. Based on a determination that a user associated with the provisioning request is trusted, the registration entity may use a trust-assigning entity to authenticate and establish a chain of trust for the untrusted device. In one example, the provisioning request may be sent via the untrusted device to the registration entity. The registration entity may determine a network address of the untrusted device based on the provisioning request and provide that address to the trust-assigning entity. The trust-assigning entity may verify the address and/or other information and assign a cryptographically-unique trust token to the untrusted device.

In another example, a provisioning request for an untrusted device may be sent to the registration entity via a separate network (e.g., a wide-area wireless network). The registration entity may obtain, from the trust-assigning entity, a list of other devices connected to the untrusted device. The registration entity may request confirmation of the other devices. Based on such confirmation, the registration entity may request the trust-assigning entity to authenticate and establish a chain of trust for the untrusted device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
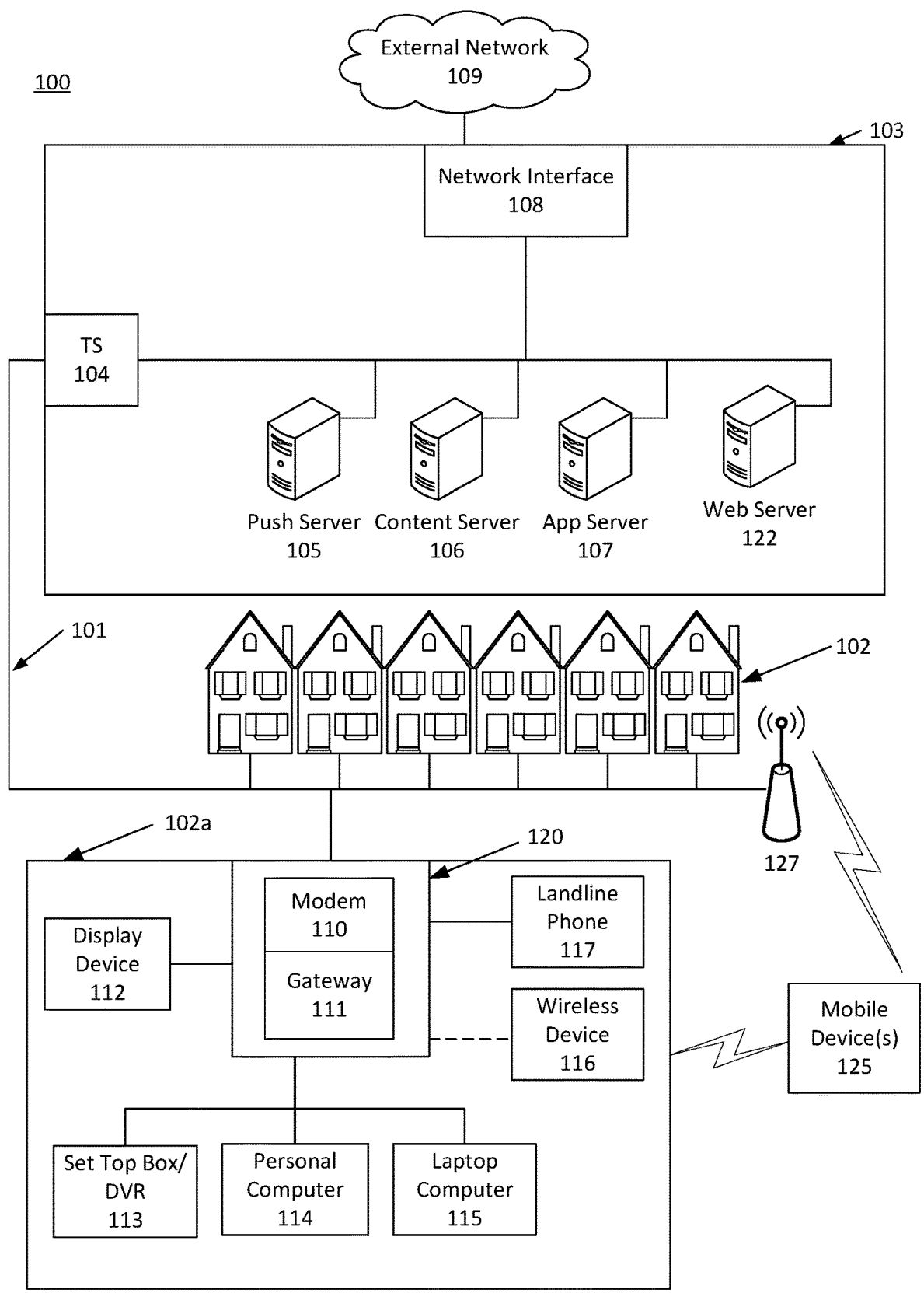
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

The communication links 101 may originate from the local office 103 and may be split to exchange information signals with the various premises 102. The communication links 101 may include components not illustrated, such as splitters, filters, amplifiers, etc. to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels. The access point 127 may be an access point such as the access point described in connection with FIG. 4 below.

The local office 103 may include an interface 104, such as a termination system (TS). The interface 104 may be a cable modem termination system (CMTS), which may be a computing device configured to manage communications between devices on the network of the communication links 101 and backend devices such as servers 105-107 and 122. The interface 104 may be configured to place data on one or more downstream frequencies to be received by modems at the various premises 102, and to receive upstream communications from those modems on one or more upstream frequencies. The local office 103 may be part of a service provider network.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. A web server 122 may be a computing device configured to process and respond to incoming requests over the network, usually using Hypertext Transfer Protocol (HTTP). For example, a web server may be responsible for delivering a web page in response to a request. A web server may also be responsible for storing and/or accessing information relating to a user account. Although the web server 122 is shown as a separate hardware element, it may also refer to software programmed to process and respond to requests over the network that resides on another computing device within the local office 103. The web server 122 may include a web portal which may provide a point of access for requesting entities/devices in customer premises 102. The local office 103 may include additional servers, including, but not limited to, additional web, push, content, and/or application servers, and/or other types of servers. Although shown separately, the push server 105, the content server 106, the application server 107, the web server 122, and/or other server(s) may be combined. The servers 105, 106, 107, and 122, and/or other servers, may be computing devices and may include memory storing data and also storing computer executable instructions that, when executed by one or more processors, cause the server(s) to perform steps described herein.

An example premises 102a may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may comprise a set-top box (STB), digital video recorder (DVR), a digital transport adapter (DTA), computer server, and/or any other desired computing device. The gateway interface device 111 may also include local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others. Interface 120 may be a CPE gateway device such as the gateway described in connection with FIGS. 3-8C.

One or more of the devices at a premises 102a may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

The mobile devices 125 may communicate with a local office 103 including, for example, with the web server 122. The mobile devices 125 may be cell phones, smartphones, tablets (e.g., with cellular transceivers), laptops (e.g., communicatively coupled to cellular transceivers), wearable devices (e.g., smart watches, electronic eye-glasses, etc.), or any other mobile computing devices. The mobile devices 125 may store, output, and/or otherwise use assets. An asset may be a video, a game, one or more images, software, audio, text, webpage(s), and/or other content. The mobile devices 125 may include Wi-Fi transceivers, cellular transceivers, satellite transceivers, and/or global positioning system (GPS) components.

Figure 2:
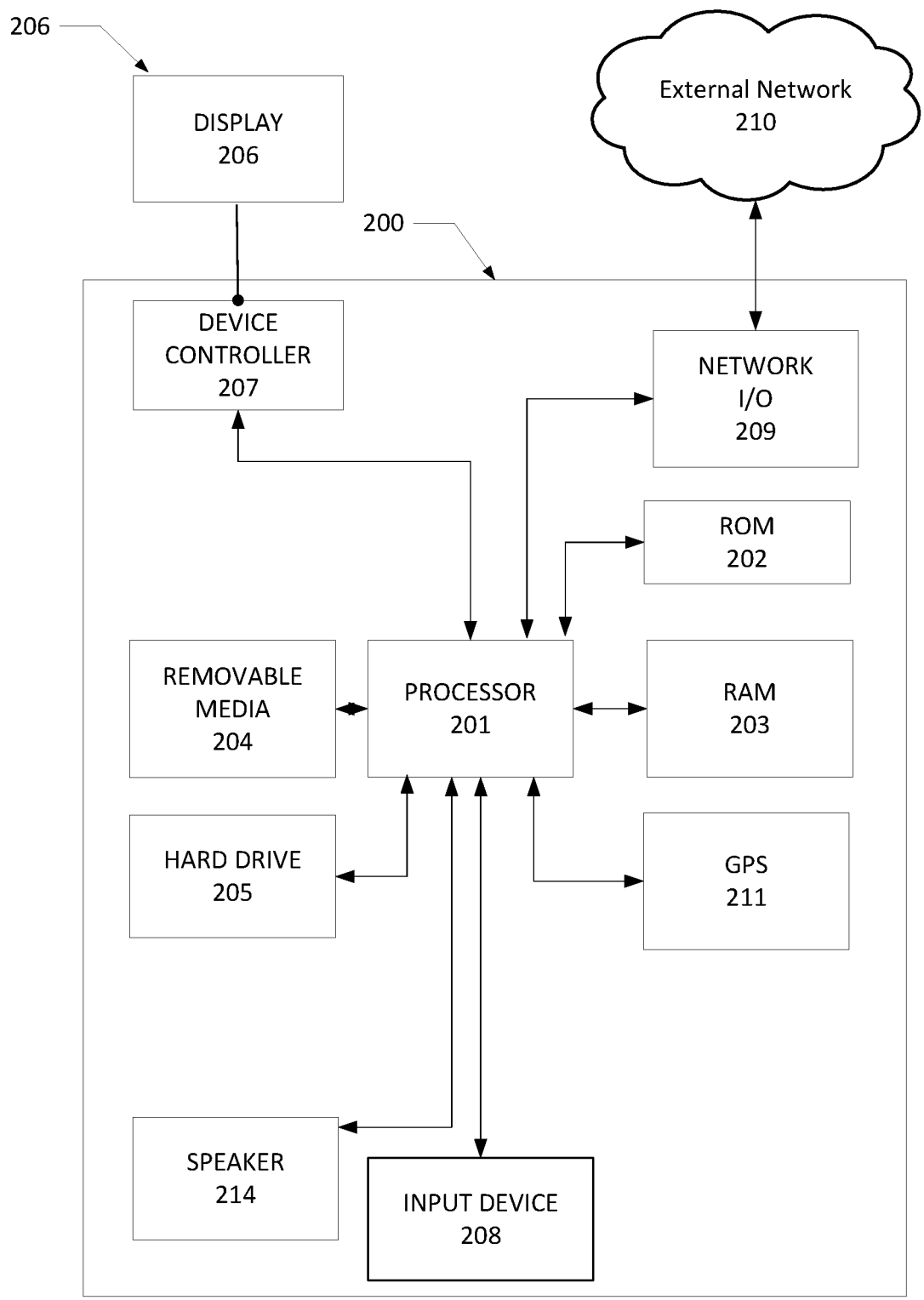
FIG. 2 shows hardware elements of a computing device.

FIG. 2 shows hardware elements of a computing device that may be used to implement any of the computing devices discussed herein (e.g., a server, a CPE gateway or other device for which trust is established, a user device). The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the computing device 200 may include a location-detecting device, such as a global positioning system (GPS) microprocessor 211, which can be configured to receive and process global positioning signals and determine, with possible assistance from an external server and antenna, a geographic position of the device.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
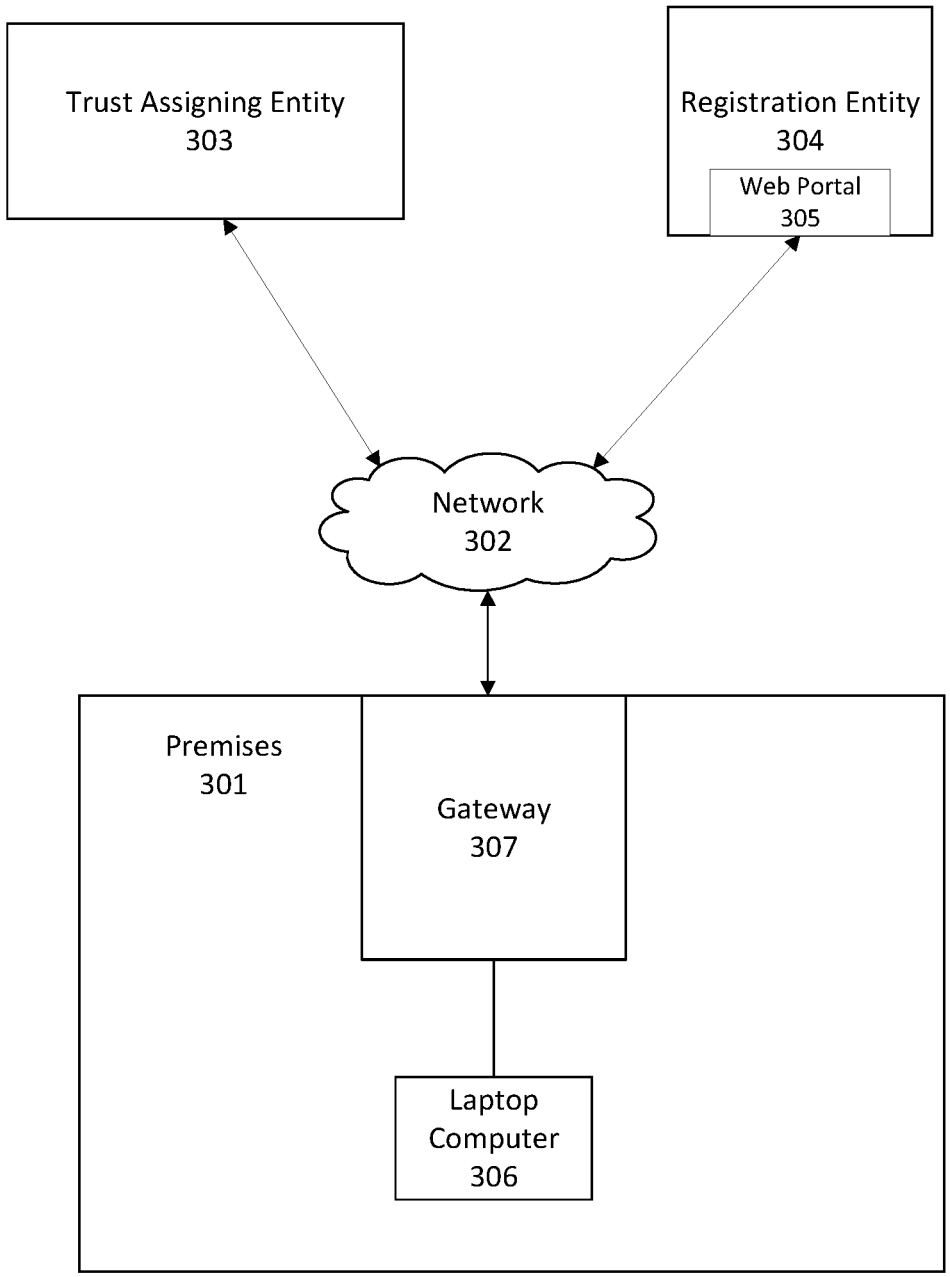
FIG. 3 shows an example of a system for establishing (or re-establishing) trust for an untrusted computing device connected to a network.

FIG. 3 shows an example of a system for establishing (or re-establishing) trust for an untrusted computing device connected to a network. Although the examples of FIG. 3 and of subsequent FIGS. describe a CPE gateway as an untrusted computing device for which trust is established, the methods described herein may also or alternatively be used to establish or re-establish trust for other types of computing devices.

One or more elements in FIG. 3 may be elements from FIG. 1. Network 302 may, for example, comprise the communication links 101 and/or the external network 109 and/or other networks. Premises 301 may be a premises such as the premises 102*a*. Trust-assigning entity 303 may comprise one or more web servers 122 located in one or more local offices 103 or elsewhere. The trust-assigning entity 303 may also comprise a websocket translator and be configured to provide websocket communications for a gateway 307 in the customer premises 301 and for other devices in other customer premises. For example, upon connection to the trust-assigning entity 303, a communication path may remain open indefinitely to allow two-way communications, at a low-level protocol, between the trust-assigning entity 303 and connected devices. The trust-assigning entity 303 may also be configured to perform operations in addition and/or unrelated to establishing trust with an untrusted device (e.g., network management operations).

Registration entity 304 may also comprise one or more web servers 122 located in one or more local offices 103 or elsewhere. The registration entity 304 may execute software that provides a web portal 305 that may be accessible via the network 302. The web portal 305 may require a user device to provide (e.g., based on input from a user) login credentials, such as a username and password, and may also store and/or access other data (e.g., account information, phone numbers or other data to facilitate two-party authentication) usable to authenticate a user and/or a device associated with a user or a user account. The registration entity 304 and the trust-assigning entity 303 may be in communication via the network 302. The registration entity 304 and the trust-assigning entity 303 may also or alternatively be in communication via another network (e.g., a local area network in a local office 103).

The trust-assigning entity 303 and the registration entity 304 are shown as separate elements in the example of FIG. 3. Various elements depicted in FIG. 3 may be implemented or grouped together in any way desired. In other examples, the functionality of the trust-assigning entity 303 and the registration entity 304 may be implemented at one computing device or across more than two computing devices.

The premises 301 includes the gateway 307. The gateway 307 may be, for example, a computing device such as the interface 120 of FIG. 1. The gateway 307 may communicate with the trust-assigning entity 303 and the registration entity 304 via the network 302. The premises 301 may also include a user device, such as a laptop computer 306, through which a user may communicate with the registration entity 304 via the gateway 307. The gateway 307 may communicate with the laptop computer 306 via, e.g., a local network within the premises 301. Although a single user device is shown in FIG. 3, a premises 301 may include any number of user devices. User devices may include computing devices such as personal computers, desktop computing devices, laptop computing devices, tablet computing devices, palmtop computing devices, cellular telephones (e.g., smartphones and feature phones), network-enabled televisions (e.g., "smart" televisions), network-enabled video game machines, STBs, DVRs, network-enabled audio devices, network-enabled data storage devices, network enabled home appliances, and other types of computing devices having a network interface suitable for exchanging communications via a local network, the network 302, and/or other networks.

The laptop computer 306 may be configured to generate and send a service request, such as is described below. The web portal 305 on the registration entity 304 may be configured to receive service requests from user devices, such as the laptop computer 306. The registration entity 304 may be configured to determine whether a user associated with the service request and/or with a user device is trusted, to generate and send a request to assign a cryptographically-unique token for the gateway 307, and to perform other operations described herein. The trust-assigning entity 303 may be configured to generate the cryptographically-unique token for the gateway 307 and to perform other operations described herein.

Figure 4:
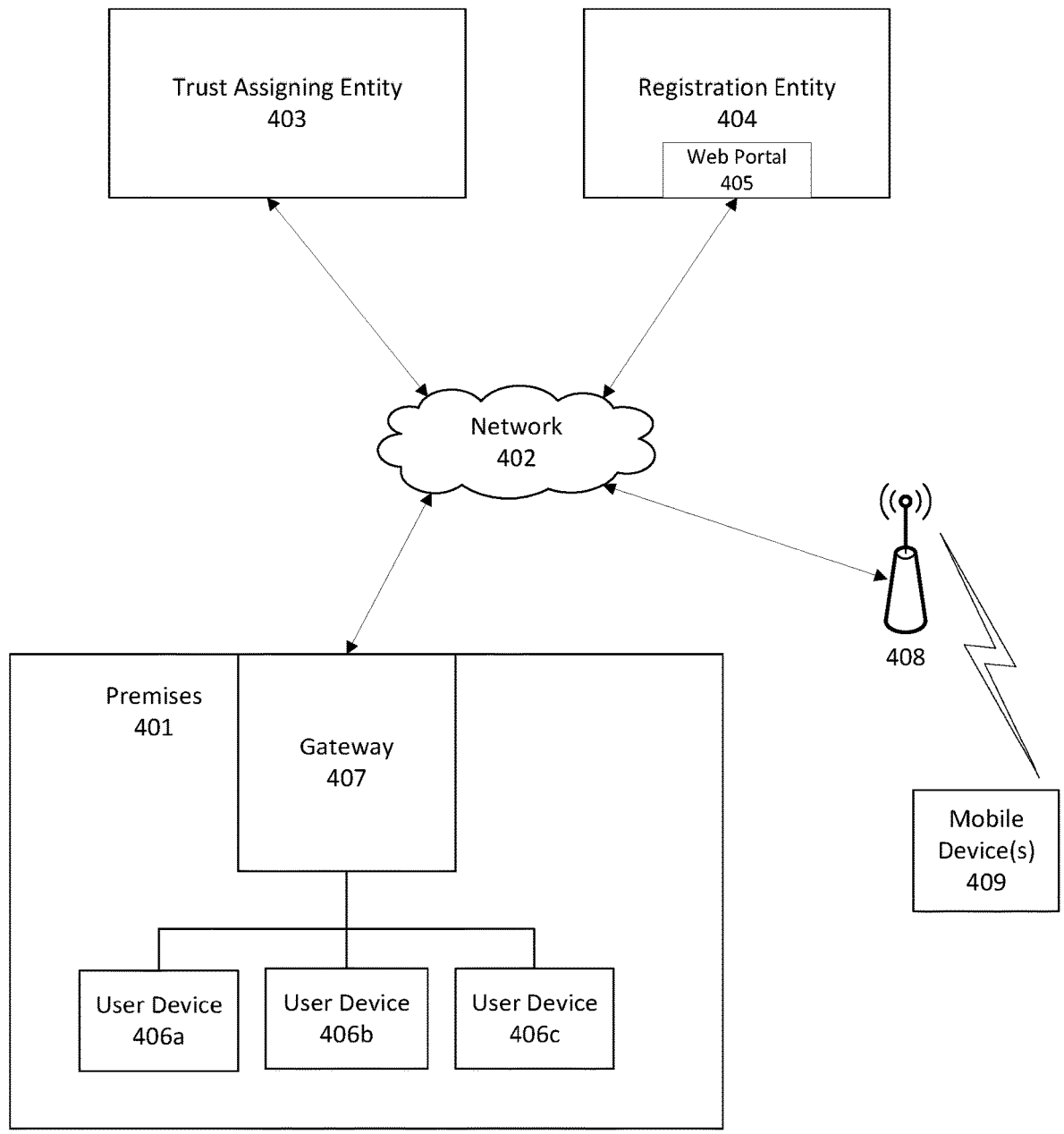
FIG. 4 shows an example of another system for establishing (or re-establishing) trust for an untrusted computing device connected to a network.

FIG. 4 shows another example system for establishing (or re-establishing) trust for an untrusted computing device connected to a network. Trust-assigning entity 403, registration entity 404, web portal 405, network 402, and gateway 407 may respectively be similar to the trust-assigning entity 303, the registration entity 304, the web portal 305, the network 302, and the gateway 307. However, the trust-assigning entity 403, the registration entity 404, the web portal 405, the network 402, and the gateway 407 may be configured to perform, in addition to (or as an alternative to) operations described in connection with FIGS. 3, 5, and 7A-7C, operations such those described below and in connection with FIGS. 6 and 8A-8C. Premises 401 may also be a premises similar to the premises 102a. Multiple user devices 406a through 406c may communicate with the gateway 407 via, e.g., one or more local networks. Access point 408 may be, e.g., an access point similar to the access point 127 (FIG. 1) and be configured to provide wireless communication channels permitting one or more mobile devices, such as mobile device 409, to communicate with registration entity 404 via network 402. Mobile device 409 may be, e.g., a mobile device such as the mobile device 125 of FIG. 1 and may be (or include) a cellular mobile device, and the wireless communication channels may be Wi-Fi IEEE 802.11 channels, cellular channels (e.g., LTE), and/or satellite channels.

The registration entity 404 may be configured to store data representing an association between an interface device and a user and/or between an interface device and a user device. The registration entity 404 may also be configured to access such association data. The web portal 405 may be accessible via the network 402. Upon receiving a request from a user device (e.g., based on input from a user), the web portal 405 may require login credentials (provided, e.g., by user input to the mobile device 409), such as a username and password. Login credentials may be linked to such association data that may be stored and/or accessed by the registration entity 404.

The trust-assigning entity 403 and the registration entity 404 are shown as separate elements in the example of FIG. 4. As with the example of FIG. 3, the elements of FIG. 4 may be grouped or re-arranged as desired. In other examples, the functionality of the trust-assigning entity 403 and the registration entity 404 may be implemented at one computing device or across more than two computing devices.

The mobile device 409 may be configured to generate and send a service request, such as a request to provision, or re-provision, a gateway 407, to the registration entity 404. The registration entity 404 may be configured to receive such service requests from the mobile device 409.

Figure 5:
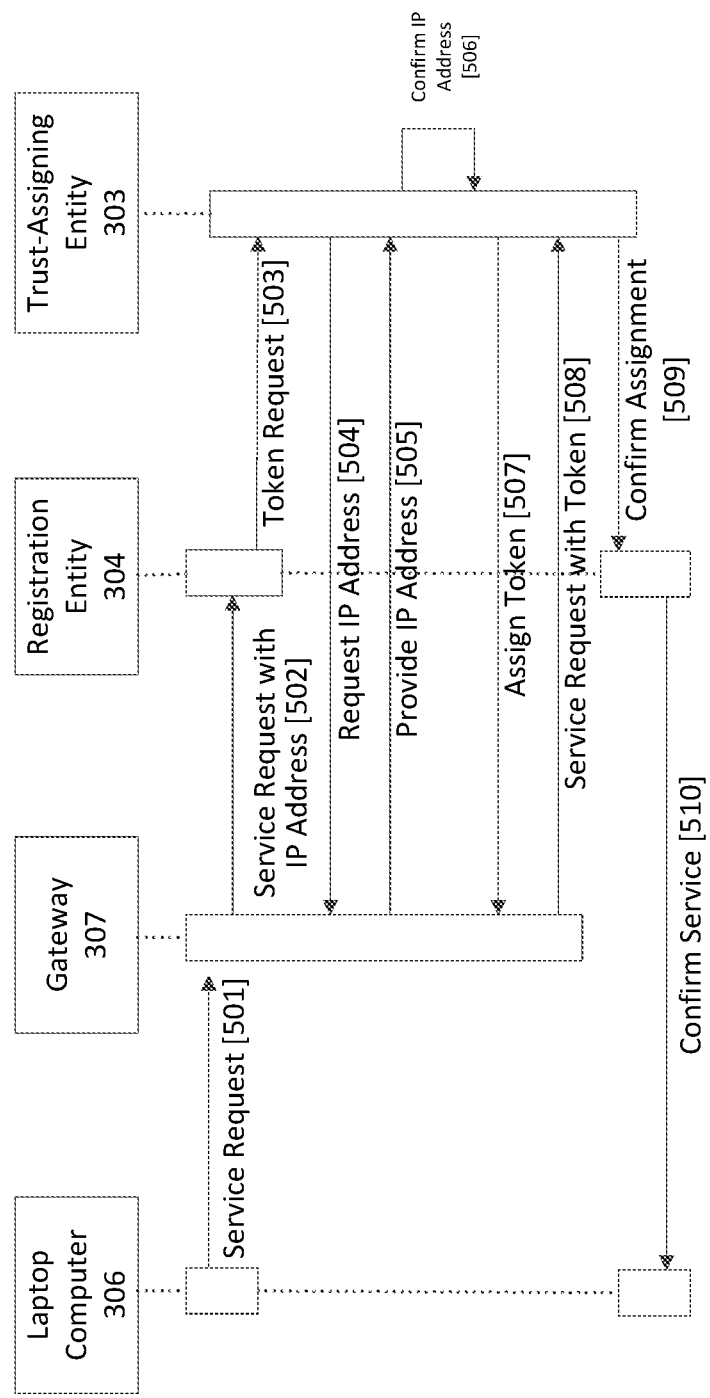
FIG. 5 is a sequence diagram showing an example authentication process.

FIG. 5 is a sequence diagram showing an example procedure for establishing (or re-establishing) trust for an untrusted computing device connected to a network using the system described above in FIG. 3. Although FIGS. 3 and 5 show the laptop computer 306 as the device through which a user may communicate with a registration entity 304, user devices other than the laptop computer 306, such as those described above, could perform the operations shown for the laptop computer 306. Similarly, another type of computing device could perform the operations associated with the gateway 307 so as to become a trusted device in the network 302.

In step 501, the laptop computer 306 may generate and submit a service request via the gateway 307. The service request may be, for example, a request to provision, or re-provision, the gateway 307. The service request may include login credentials (e.g., a user name and password) for a user of the laptop computer to access the registration entity 304 via the web portal 305. The credentials may be associated with an account of the user with an entity that operates the registration entity 304 and/or the network 302. The service request may include information such as the laptop computer 306 IP address, the laptop computer 306 MAC address, or other information that would assist the registration entity 304 and/or the trust-assigning entity 303 in authenticating the identity of the laptop computer 306 and/or the user of the laptop computer 306.

The service request sent in step 501 may include identifying information for the gateway 307, such as an address of the gateway 307 in the network 302 (e.g., an Internet Protocol (IP) address). In a system using IPv4 addressing, the laptop computer 306 may obtain the public IP address of the gateway 307, for example, by executing a request to a STUN (Session Traversal of User Datagram Protocol [UDP] Through Network Address Translators [NATs]) server to determine the public IP address of the gateway 307, and may add the public IP address of the gateway 307 to the service request.

The gateway 307 may alter the service request, as received from the laptop computer 306, to add identifying information. If not included by the laptop computer 306, for example, the gateway 307 may add its IP (or other network) address, its MAC address, and/or other information that may assist the registration entity 304 and/or the trust-assigning entity 303 in authenticating the identity of the gateway 307. In one example, the gateway 307 may replace the source IP address and port information of the laptop computer 306 with the gateway 307 IP address and port information. The gateway 307 may add identifying information to the service request in a message header, as metadata and/or in other ways. In step 502, the gateway 307 sends the service request with any added information to the registration entity 304.

The registration entity 304 may determine whether the user initiating the service request is a trusted user based on whether proper login credentials are provided within, or in conjunction with, the service request. If the credentials are validated, the user may be determined to be a trusted user. Based on the trusted status of the user, in step 503 the registration entity 304 may generate and send, to the trust-assigning entity 303, a request to assign a cryptographically-unique token to the gateway 307. The request to assign the token may include identifying information for the gateway 307 and/or the laptop computer 306 that was received in the service request.

Prior to generating the token, in step 504, the trust-assigning entity 303 may send a request to the gateway 307 to confirm the identifying information provided by the registration entity 304, including the gateway 307 IP address, the gateway 307 MAC address, and/or other gateway 307 identifying information. Additionally, or alternatively, the trust-assigning entity 303 may also authenticate the identity of the laptop computer 306 with the gateway 307, which may include confirming the laptop computer 306 IP address, the laptop computer 306 MAC address, or other information. The gateway 307 may respond with the requested confirmation of information in step 505.

In step 506, the trust-assigning entity 303 may confirm whether the identifying information provided by the gateway 307 matches or otherwise confirms the information provided by the registration entity 304. Additionally, or alternatively, the trust-assigning entity 303 may confirm that a source address of the response sent by the gateway 307 in step 505 (above) corresponds to and/or confirms the information provided by the registration entity 304. After confirming the identifying information of the gateway 307, the trust-assigning entity 303 may generate the cryptographically-unique token for the gateway 307 based on the information provided by the registration entity 304. The trust-assigning entity 303 provides the token to the gateway 307 for storage in step 507.

In step 508, the gateway 307 may use the token by providing it back to the trust-assigning entity 303 during a subsequent service request. The trust-assigning entity 303 may authenticate the identity of the gateway 307 based, at least in part, on the token provided by the gateway 307.

The trust-assigning entity 303 may provide confirmation of the authentication of the gateway 307 to the registration entity 304 as in step 509. The registration entity 304 may, in step 510, and via the gateway 307, provide the laptop computer 306 an acknowledgement that the gateway 307 authentication has been confirmed and/or that the gateway 307 is trusted and, therefore, authorized to access services via the network 302. The registration entity 304 may also store, and/or cause to be stored, data identifying the gateway 307, indicating an association between the gateway 307 and the cryptographically-unique token provided in step 507, and/or indicating an association between the gateway 307 and the service request (or any data in the service request) sent in step 501. That data may be stored in one or more locations within the network 302 and used to authenticate the gateway 307, to authorize service in the network 302 for the gateway 307, and/or for other purposes.

Figure 6:
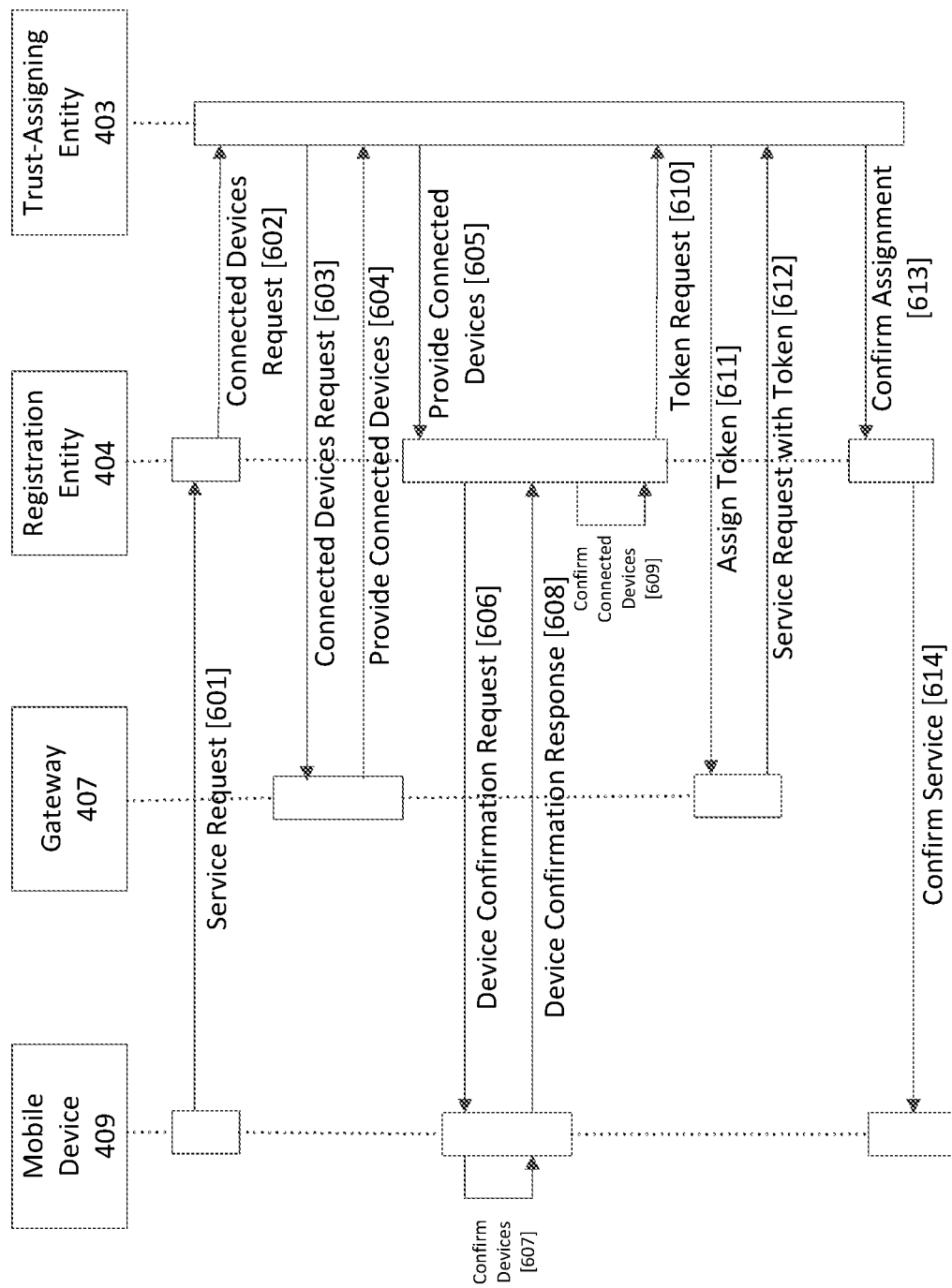
FIG. 6 is a sequence diagram showing another example authentication process.

FIG. 6 is a sequence diagram showing another example procedure for establishing (or re-establishing) trust for an untrusted computing device connected to a network using the system described above in FIG. 4. Although FIGS. 4 and 6 show the mobile device 409 as the device through which a user may communicate with the registration entity 404, computing devices other than the mobile device 409 could perform the operations shown for the mobile device 409. Similarly, another type of computing device could perform the operations associated with the gateway 407 so as to become a trusted device in the network 402.

In step 601, the mobile device 409, which is connected to a network 402 via access point 408, may generate and submit a service request (e.g., a request to provision (or re-provision) the gateway 407) to the registration entity 404. The service request may include login credentials for a user of the mobile device 409 to access the registration entity 404 via the web portal 405. Similar to the example of FIGS. 3 and 5, the login credentials may include a user name and password and be associated with an account of the user with an operator of the registration entity 404 and/or of the network 402. The service request may also include information such as the mobile device 409 IP address, the mobile device 409 MAC address, and/or other information that would assist the registration entity 404 and/or the trust-assigning entity 403 in authenticating the identity of the mobile device 409 and/or the user of the mobile device 409.

The service request sent in step 601 may further include identifying information for the gateway 407. The identifying information may include, for example, the gateway 407 IP address, the gateway 407 MAC address, and/or other information that would assist in identifying the gateway 407. The mobile device 409 may ascertain the identifying information, for example, via manual entry or bar code scanning. The service request may also, or alternatively, include information that would allow the registration entity 404 to access association data that may be linked to the login credentials and/or other information supplied in the service request. The association data may have been previously stored as a result of, for example, a prior attempt to provision the gateway 407 or the gateway 407 having been scanned prior to delivery of the gateway 407 to the premises 401.

The registration entity 404 may determine whether the user sending the service request is a trusted user based on whether proper login credentials are provided within, or in conjunction with, the service request. If the credentials are validated, the registration server 404 may access identifying information for the gateway 407 from the service request. Also or alternatively, the registration entity 404 may look up the identity of the gateway 407 by accessing association data linked to the login credentials.

In step 602, the registration entity 404 may generate and send a request, to the trust-assigning entity 403, for a list of user devices that may be currently connected to the gateway 407. The request may include identifying information received in, or in connection with, the service request of step 601. In step 603, and based on the request for a list of the user devices, the trust-assigning entity 403 may contact the gateway 407 and request a list of connected user devices. The gateway 407 may, in step 604, respond and indicate the user devices currently connected to the gateway 407, such as the user devices 406a-c. In step 605, the trust-assigning entity 403 may send the list of currently-connected devices to the registration entity 404.

In step 606, the registration entity 404 may send a list of user devices to the mobile device 409 and request (and/or cause generation by the mobile device 409 of a request) that the user confirm whether user devices in the list are currently connected to the gateway 407. The list of user devices sent to the mobile device 409 may be the same as the list of connected devices provided by the gateway 407 or may include devices that are not currently connected to the gateway 407. Optionally including devices not currently connected to the gateway 407 in the list of user devices sent to the mobile device 409 for confirmation may assist the registration entity 404 in determining whether the user has provided the registration entity 404 with login credentials that may be associated with another user.

In step 607, the mobile device 409 may present (e.g., on a graphical user interface presented on a display screen of the mobile device 409) the list of user devices to the user for confirmation. The user of the mobile device 409 may be asked (e.g., by prompting the user for input to the graphical user interface) to confirm which of the user devices are currently connected to the gateway 407, either as a group or individually. After receiving user input confirming the connected user devices, the mobile device 409 may send a confirmation of the devices currently connected to the gateway 407 to the registration entity 404 (step 608). If the user is unable to correctly confirm the devices currently connected to the gateway 407, the registration entity 404 may cancel the service request, take action to re-confirm that the user is authorized to access the system, and/or take other action to confirm that the user is in proximity to or in control of the gateway 407.

In step 609, after receiving the confirmation of the connected devices from the mobile device 409, the registration entity 404 may determine if the confirmation of the connected devices from the mobile device 409 matches the list of connected devices provided by the trust-assigning entity 403 in step 605. Upon confirming a match, the registration entity 404 may determine that the user is a trusted user and that the user is indeed in proximity to or otherwise in control of the gateway 407. Based on this determination, the registration entity 404 may generate and send, to the trust-assigning entity 403, a request to assign a cryptographically-unique token to the gateway 407 (step 610).

Optionally, prior to generating the token, the trust-assigning entity 403 may send a request (not shown) to the gateway 407 to confirm the identifying information provided by the registration entity 404 in step 603 (e.g., the gateway 407 IP address, the gateway 407 MAC address, and/or other gateway 407 identifying information) and/or re-confirm the list of devices currently-connected to the gateway 407 provided in step 604. The gateway 407 may generate and send a response to the trust-assigning entity 403 confirming the identifying information (not shown). The trust-assigning entity 403 may generate the cryptographically-unique token for the gateway 407 and provide the token to the gateway 407 for storage (step 611).

The gateway 407 may provide the token to the trust-assigning entity 403 during a subsequent access request (step 612). The trust-assigning entity 403 may authenticate the gateway 407 based, at least in part, on the token provided by the gateway 407. The trust-assigning entity 403 may provide confirmation of the authentication of the gateway 407 to the registration entity 404 (step 613). The registration entity 404 may, in step 614, provide the mobile device 409 an acknowledgement that the gateway authentication has been confirmed and/or that the gateway 407 is trusted and, therefore, authorized to access services on the network 402. The registration entity 404 may also store, and/or cause to be stored, data identifying the gateway 407 and indicating an association between the gateway 407 and the cryptographically-unique token provided in step 611. That data may be stored in one or more locations within the network 402 and used to authenticate the gateway 407, to authorize service in the network 402 for the gateway 407, and/or for other purposes.

Figure 7A:
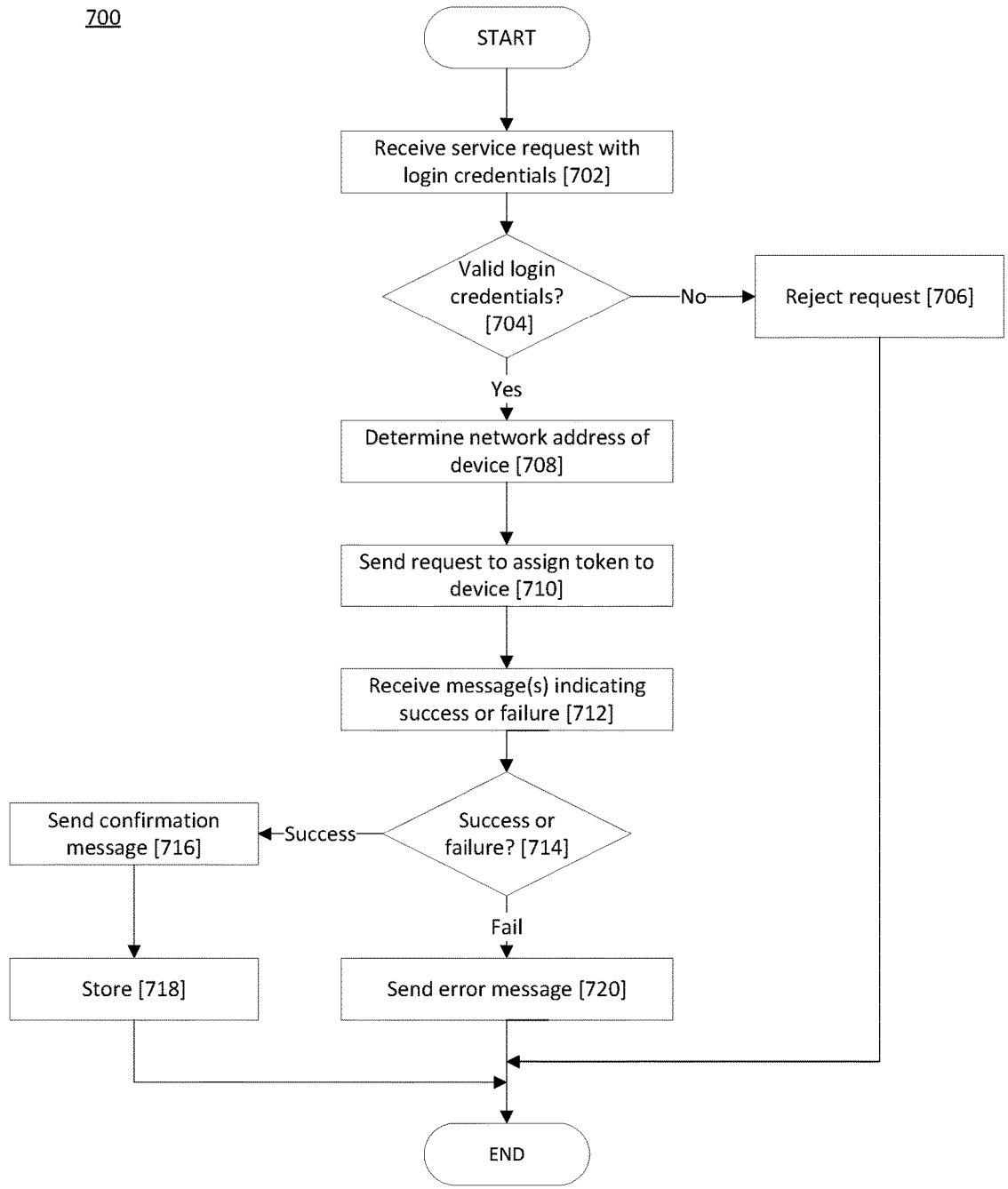
FIGS. 7A through 7C are flow charts respectively showing example methods performed by a registration entity, a trust-assigning entity, and a CPE gateway.
Figure 7B:
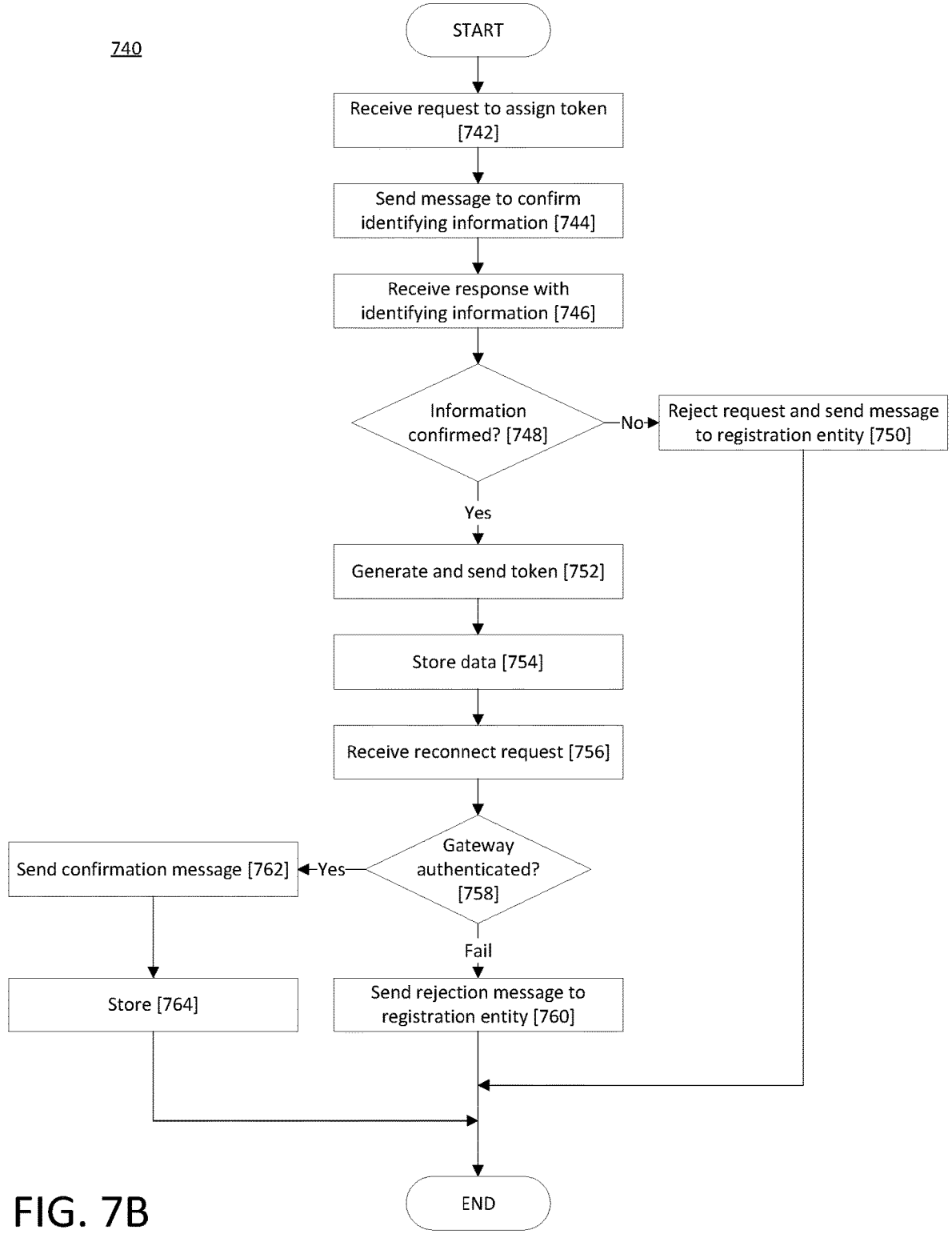
Figure 7C:
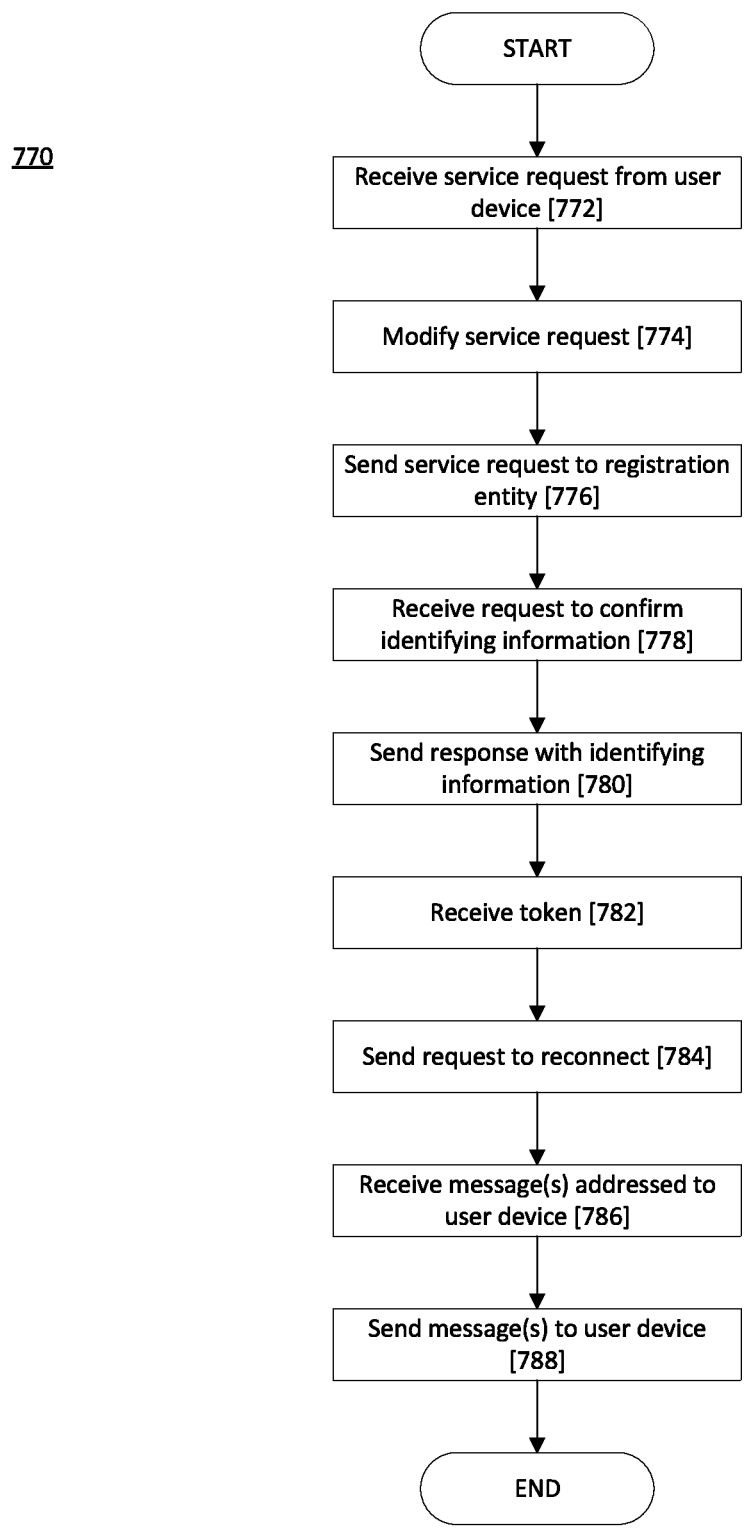

FIGS. 7A-7C are flow charts showing example methods performed by a registration entity (FIG. 7A), a trust-assigning entity (FIG. 7B), and a gateway (FIG. 7C) in the system of FIG. 3. The methods of FIGS. 7A-7C could also, or alternatively, be performed in connection with other elements in other networks. The methods shown in FIGS. 7A-7C and/or one or more steps thereof may be performed based on execution, by one or more processors of one or more computing devices, of instructions that are stored in a computer-readable medium, such as a non-transitory computer-readable memory. The steps in these flow diagrams need not all be performed in the order described or shown, and some steps may be omitted and/or otherwise changed.

FIG. 7A is a flow chart showing an example method 700 performed by the registration entity 304 for establishing (or re-establishing) trust for an untrusted computing device. In the examples of FIGS. 7A-7C, the gateway 307 is an untrusted computing device until trust is established. In step 702, the registration entity 304 may receive a service request from a user device, e.g., the laptop computer 306, via the gateway 307 and the network 302. The service request may comprise one or more messages and may comprise a request to establish trust with the gateway 307. The request may be an initial request or may be a request to re-establish trust after a certificate of trust has been revoked or otherwise compromised. The service request may include login credentials, such as a username and password, for a user of the user device to access the registration entity 304. The request may also include identifying information for the user device 306 (e.g., the user device 306 IP address, the user device 306 MAC address, and/or other information that would assist in identifying the user device 306) and/or for the gateway 307 (e.g., the gateway 307 IP address, the gateway 307 MAC address, and/or other information that would assist in identifying the gateway 307).

In step 704, after the service request is received, the registration entity 304 may determine whether the login credentials supplied with, or in conjunction with, the service request are valid. If not, the service request may be rejected (step 706). If the login credentials are valid, the registration entity 304 may determine a network address of the gateway 307 in the network 302 (step 708). The registration entity 304 may determine that network address by accessing identifying information for the gateway 307 from the content or header information of the service request. The registration entity 304 may also or alternatively determine the network address of the gateway 307 by accessing association data linked to the login credentials (e.g., a table indexed to information identifying a user or address associated with a user).

After the address of the gateway 307 in the network 302 has been determined, the registration entity 304 may send one or more messages that comprise a request to the trust-assigning entity 303 to generate and assign a cryptographically-unique token to the gateway 307 (step 710). In step 712, the registration entity 304 may receive one or more messages from the trust-assigning entity 303 that indicate whether a cryptographically-unique token was successfully assigned to the device identified in the request of step 710 (the gateway 307 in the present example), or whether there was a failure. In step 714, the registration entity 304 may determine if the message(s) of step 712 indicates success or failure. If the registration entity 304 determines in step 714 that the message(s) received in step 712 indicate success, the registration entity 304 may in step 716 send one or more messages to the user device, via the network 302 and the gateway 307, that indicate the gateway 307 is trusted and, therefore, authorized to obtain service in the network 302. In step 718, the registration entity 304 may store, and/or may cause other elements in the network 302 to store, data identifying the gateway 307 and indicating an association between the gateway 307 and the cryptographically-unique token. If the registration entity 304 determines in step 714 that the message(s) received in step 712 indicate the attempt to assign a token failed, the registration entity 304 may in step 720 send one or more messages to the user device, via the network 302 and the gateway 307, that indicate one or more errors (and/or reasons for the error(s)) and that the gateway 307 is not authorized to obtain service in the network 302.

FIG. 7B is a flow chart showing an example method 740 performed by the trust-assigning entity 303 in the system of FIG. 3. In step 742, the trust-assigning entity 303 may receive a request from the registration entity 304 to generate and assign a cryptographically-unique token for the gateway 307. The request may be, e.g., the message(s) sent by the registration entity 304 in step 710 of FIG. 7A, and may comprise identifying information for the gateway 307 (e.g., IP address, MAC address, and/or other information). Based on the request received in step 742, the trust-assigning entity 303 may send one or more messages to the gateway 307 to confirm the identifying information about the gateway 307 received in the request (step 744).

After receiving one or more response messages from the gateway 307 (step 746), the trust-assigning entity 303 may determine whether the information in the response message(s) matches or otherwise confirms the identifying information provided by the registration entity 304 (step 748). Additionally, or alternatively, the trust-assigning entity 303 may confirm, in step 748, that the source address of the response message(s) received from the gateway 307 in step 746 corresponds to and/or confirms the information provided by the registration entity 304. If the information is not confirmed, the trust-assigning entity 303 may reject the request and send one or more messages to the registration entity 304 regarding the rejection (step 750). The message(s) may indicate the why the rejection occurred (e.g., the gateway 307 did not respond, the gateway 307 responded with the information that did not match information provided by the registration entity 304, etc.). The message(s) sent by the trust-assigning entity 303 in step 750, or alternatively the message(s) sent in step 760 (discussed below), may be the message(s) received by the registration entity 304 in step 712 (FIG. 7A).

If the identifying information is confirmed by the trust-assigning entity 303, the trust-assigning entity 303 may generate and send a cryptographically-unique token to the gateway 307 for storage (step 752). The trust-assigning entity 303 may also store data associating the token with the gateway 307 and/or the identifying information provided by the registration entity 304 (step 754).

The trust-assigning entity 303 may receive an acknowledgement of the token from the gateway 307 prior to, or in conjunction with, one or more subsequent service requests, such as a request to reconnect using the token (step 756). In step 758, after receipt of the reconnect request, the trust-assigning entity 303 may attempt to authenticate the identity of the gateway 307 based, at least in part, on the token received from the gateway 307 in step 756. If the trust-assigning entity 303 determines in step 758 that the identity of the gateway is not authenticated, trust-assigning entity 303 may in step 760 send one or more messages to the registration entity 304 that the authentication attempt failed. The one or more messages sent in step 760 may also, or alternatively, state the reason for the failure. If the trust-assigning entity 303 determines in step 758 that the identity of the gateway is authenticated, in step 762, the trust-assigning entity 303 may send one or more messages to the registration entity 304 that indicate the gateway 307 is trusted and, therefore, authorized to obtain service in the network. In step 764, the trust-assigning entity 303 may store and/or may cause other elements in the network 302 to store, data identifying the gateway 307 as authorized to obtain service in the network.

FIG. 7C is a flow chart showing an example method 770 performed by a network computing device, such as gateway 307, in the system of FIG. 3. The gateway 307 may receive a service request from the user device via the local network within the premises 301, such as a request to provision, or re-provision, the gateway 307 and may include a destination address for a registration entity 304 (step 772). The service request may include source information for the request such as the user device IP address, the user device MAC address, and/or other identifying information. The service request may also include identifying information for the gateway 307 (e.g., an IP address and/or other identifying information). Additionally, or alternatively, in step 774, the gateway 307 may be configured to modify the service request. The service request may be modified by adding identifying information for the gateway 307 which may include, for example, an address of the gateway 307 in the network 302 (e.g., an IP address), the gateway 307 MAC address, and/or other information that would assist the registration entity 304 in authenticating the identity of the gateway 307. In one example, the gateway 307 may modify the source IP address and port information in the service request using network address translation (NAT). In another example, the gateway 307 may modify the service request by adding identifying information for the gateway 307 to the request as header information, as metadata, and/or another way. The gateway 307 may send the service request to the registration entity 304 in step 776.

In step 778, the gateway 307 may receive a request from the trust-assigning entity 303 requesting the gateway 307 IP address and/or other identifying information. The request may be, e.g., the message(s) sent by the trust-assigning entity 303 in step 744 in FIG. 7B. In step 780, the gateway 307 may respond to the trust-assigning entity 303 with its IP address and/or other requested information in the content of the message(s), in a message header, as metadata and/or in other ways. The gateway 307 may, in step 782, receive a cryptographically-unique token from the trust-assigning entity 303 for storage. After receiving the token, in step 784, the gateway 307 may send an acknowledgement and/or a request to reconnect to the trust-assigning entity 303 using the token. After the request to reconnect is sent, in step 786 the gateway 307 may receive one or more messages from the registration entity 304 addressed to the user device. The one or more messages may be, e.g., the message(s) sent by the registration entity 304 in step 716 or alternatively the message(s) sent in step 720. In step 788, the gateway 307 may forward the one or more messages to the user device according to the destination information in the one or more messages.

Figure 8A:
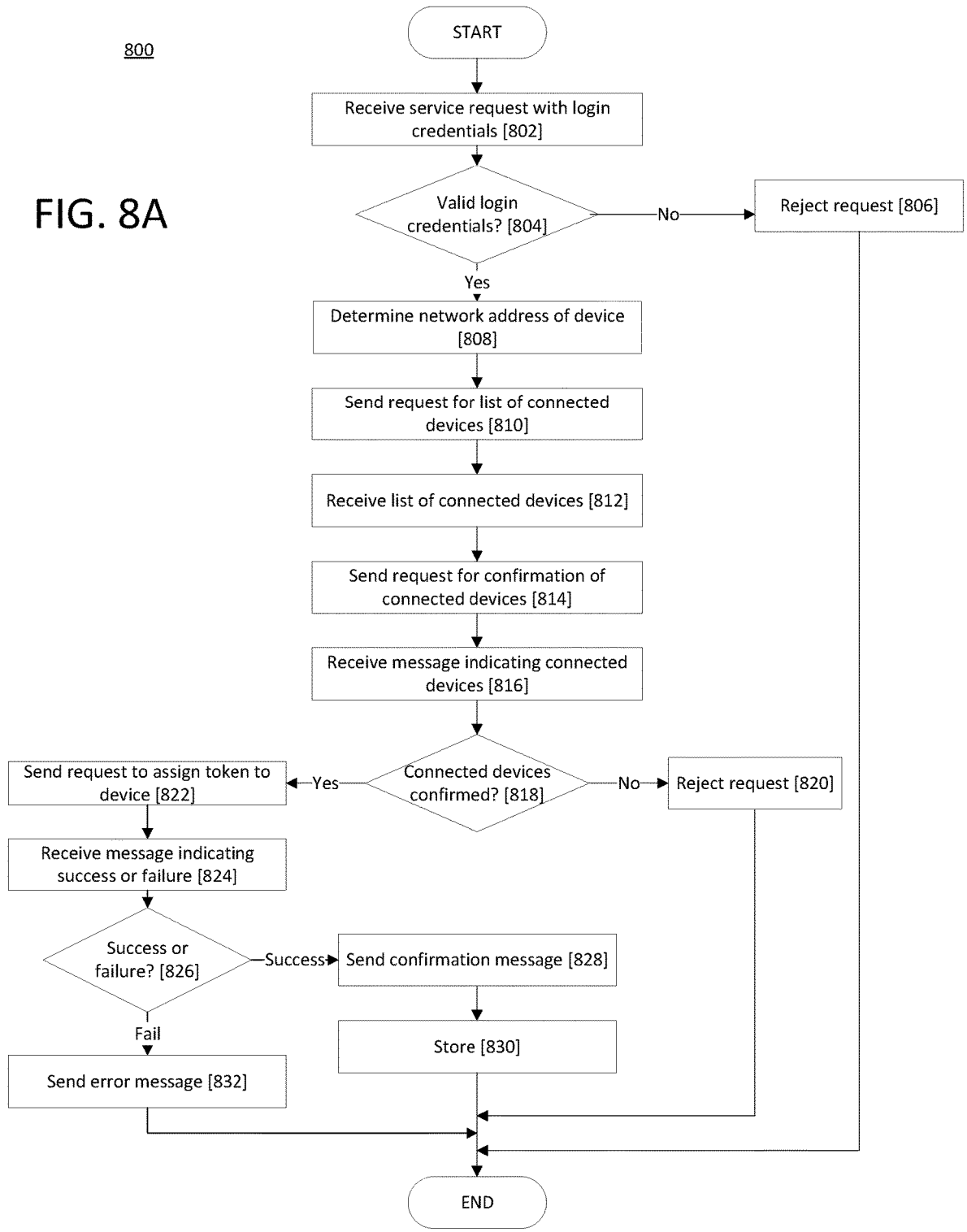
FIGS. 8A through 8C are flow charts respectively showing additional example methods performed by a registration entity, a trust-assigning entity, and a CPE gateway.
Figure 8B:
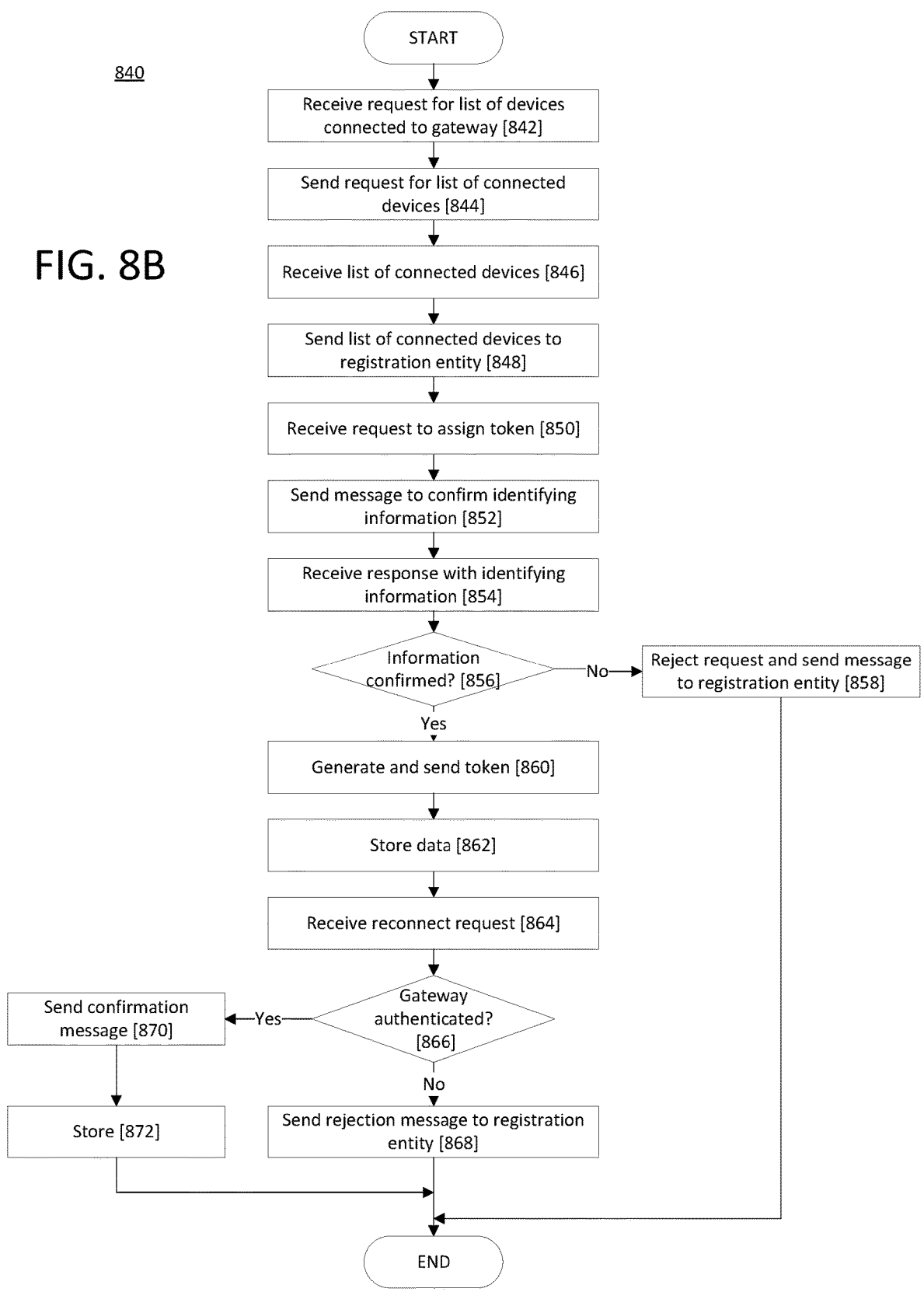
Figure 8C:
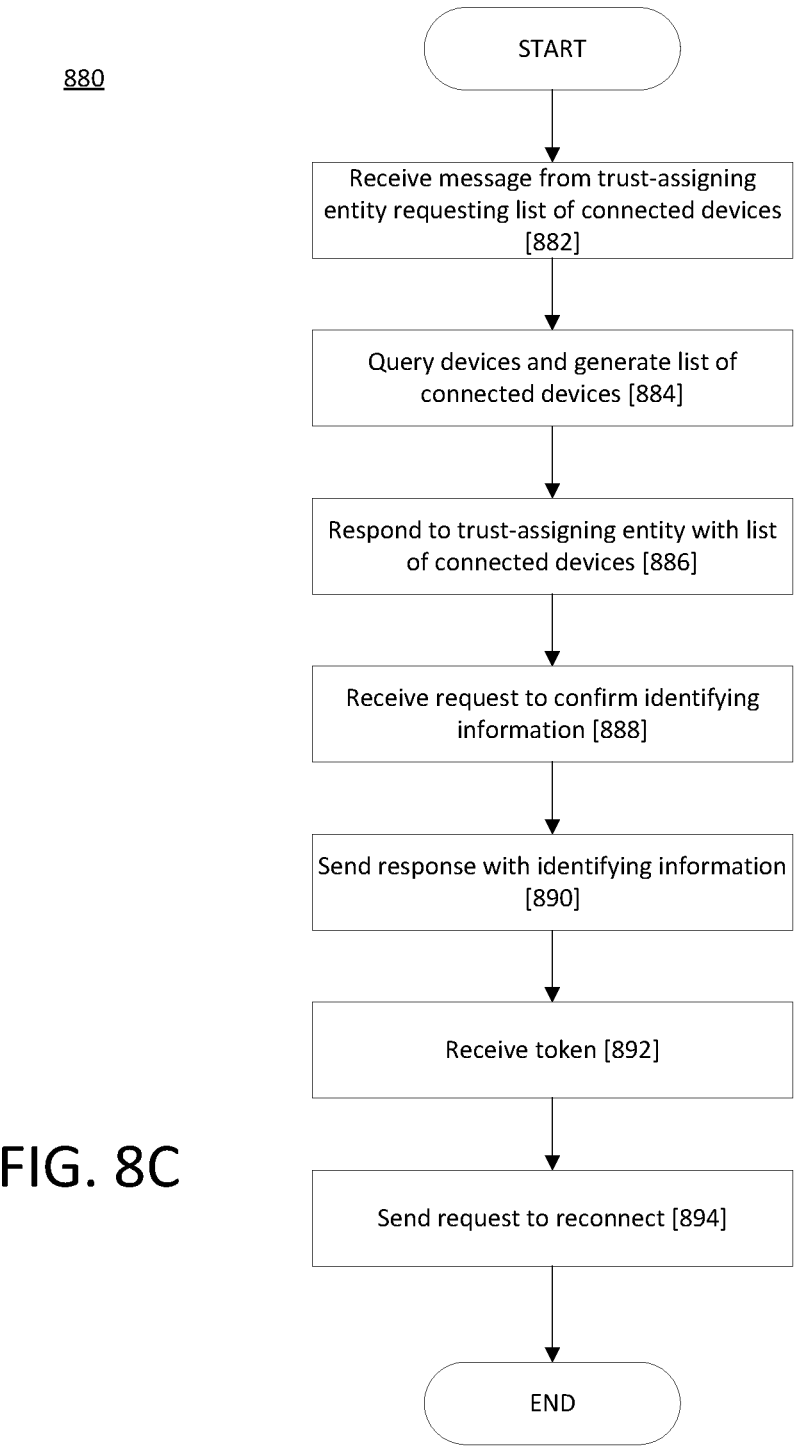

FIGS. 8A-8C are flow charts showing additional example methods performed by a registration entity (FIG. 8A), a trust-assigning entity (FIG. 8B), and a gateway (FIG. 8C) in the system of FIG. 4. The methods of FIGS. 8A-8C could also, or alternatively, be performed in connection with other elements in other networks. The methods of FIGS. 8A-8C and/or one or more steps thereof may be performed based on execution, by one or more processors of one or more computing devices, of instructions that are stored in a computer-readable medium, such as a non-transitory computer-readable memory. The steps in these flow diagrams need not all be performed in the order described or shown, and some steps may be omitted and/or otherwise changed.

FIG. 8A is a flow chart showing an example method 800 performed by the registration entity 404 for establishing (or re-establishing) trust for an untrusted computing device. In the examples of FIGS. 8A-8C, the gateway 407 is an untrusted computing device until trust is established. In step 802, the registration entity 404 may receive a service request from a mobile device, e.g., the mobile device 409, via a wireless access point 408 and the network 402. The service request may comprise one or more messages and may comprise a request to establish trust with the gateway 407. The request may be an initial request or may be a request to re-establish trust after a certificate of trust has been revoked or otherwise compromised. The service request may include login credentials, such as a username and password, for a user of the mobile device to access the registration entity 404. The request may also include identifying information for the mobile device 406 (e.g., the mobile device 406 IP address, the mobile device 406 MAC address, and/or other information that would assist in identifying the mobile device 406) and/or for the gateway 407 (e.g., the gateway 407 IP address, the gateway 407 MAC address, and/or other information that would assist in identifying the gateway 407).

In step 804, after the service request is received, the registration entity 404 may determine whether the login credentials supplied with, or in conjunction with, the service request are valid. If not, the service request may be rejected (step 806). As part of step 806, a message may be sent to the mobile device 409 indicating rejection and/or reason for the rejection. If the login credentials are valid, the registration entity 404 may determine a network address of the gateway 407 in the network 402 (step 808). The registration entity 404 may determine that network address by accessing identifying information for the gateway 407 from the service request. The registration entity 404 may also or alternatively determine the network address of the gateway 407 by accessing association data linked to the login credentials supplied by the mobile device 409 (e.g., a table indexed to information identifying a user or address associated with a user).

In step 810, after the address of the gateway 407 in the network 402 has been determined, the registration entity 404 may send one or more messages that comprise a request to the trust-assigning entity 403 to retrieve a list of devices that are currently connected to the gateway 407. In step 812, registration entity 404 may receive a message from the trust-assigning entity 403 with the list of currently connected devices.

In step 814, the registration entity 404 may send a list of user devices to the mobile device 409 and request (and/or cause generation by the mobile device 409 of a request) that the user confirm whether user devices in the list are currently connected to the gateway 407. The list of user devices sent to the mobile device 409 may be the same as the list of connected devices received in step 812, or may include the list received in step 812 together with indications of additional devices that are not currently connected to the gateway 407. In step 816, the registration entity 404 may receive one or more messages from the mobile device 409 indicating the devices currently connected to the gateway 407.

Upon receiving the message(s) in step 816, the registration entity 403 may determine in step 818 whether the indication of connected devices from the mobile device 409 matches the list of currently connected devices provided by the trust-assigning entity 403. If the currently connected devices are not confirmed (e.g., if the indication of connected devices from the message(s) of step 816 does not match the list received in step 812), the registration entity 404 may send one or more message to the mobile device 409 rejecting the request (step 820). If the currently connected devices are confirmed, the registration entity may send one or more messages that comprise a request to the trust-assigning entity 403 to generate and assign a cryptographically-unique token to the gateway 407 (step 822).

In step 824, the registration entity 404 may receive one or more messages from the trust-assigning entity 403 that indicate whether a cryptographically-unique token was successfully assigned to the device identified in the token assignment request of step 822 (the gateway 407 in the present example), or whether there was a failure. In step 826, the registration entity 404 may determine if the message(s) of step 824 indicates success or failure. If the registration entity 404 determines in step 826 that the message(s) received in step 824 indicate success, the registration entity 404 may in step 828 send one or more messages to the mobile device, via the network 402, that indicate the gateway 407 is trusted, and, therefore, authorized to obtain service in the network 402. In step 830, the registration entity 404 may store, and/or may cause other elements in the network 402 to store, data identifying the gateway 407 and indicating an association between the gateway 407 and the cryptographically-unique token. If the registration entity 404 determines in step 826 that the message(s) received in step 824 indicate the attempt to assign a token failed, the registration entity 404 may in step 832 send one or more messages to the mobile device, via the network 402, that indicate one or more errors (and/or reasons for the error(s)) and that the gateway 407 is not authorized to obtain service in the network 402.

FIG. 8B is a flow chart showing an example method 840 performed by the trust-assigning entity 403 in the system of FIG. 4. In step 842, the trust-assigning entity 403 may receive a request from the registration entity 404 for a list of user devices that may be currently connected to the gateway 407. The request may be, e.g., the message(s) sent by the registration entity 404 in step 810 of FIG. 8A. In step 844, the trust-assigning entity 403 may contact the gateway 407 and request a list of connected user devices.

In step 846, the trust-assigning entity 403 may receive one or more message(s) from the gateway 407 indicating user devices currently connected to the gateway 407. In step 848, the trust-assigning entity 403 may send the list of currently-connected devices to the registration entity 404.

If the registration entity 404 is not able to confirm the list of currently connected devices in step 818 of FIG. 8A, the trust-assigning entity 403 may not receive any further messages from the registration entity 404 and the method of FIG. 8B may time out and terminate. If the registration entity 404 is able to confirm the list of currently connected devices (step 818 of FIG. 8A), in step 850, the trust-assigning entity 403 may receive a request from the registration entity 404 to generate and assign a cryptographically-unique token for the gateway 407. The request may be, e.g., the message(s) sent by the registration entity 404 in step 820 of FIG. 8A, and may comprise identifying information for the gateway 407 (e.g., IP address, MAC address, and/or other information). Based on the request received in step 850, the trust-assigning entity 403 may optionally send one or more messages to the gateway 407 to confirm the identifying information about the gateway 407 received in the request (step 852).

After receiving one or more response messages from the gateway 407 (step 854), the trust-assigning entity 403 may in step 856 determine whether the information in the response message(s) matches or otherwise confirms the identifying information received from the registration entity 404 in step 842 and/or in step 850. If not, the trust-assigning entity 403 may reject the request and send one or more messages to the registration entity 404 regarding the rejection (step 858). The message(s) may indicate the why the rejection occurred (e.g., the gateway 407 did not respond, the gateway 407 responded with the information that did not match information provided by the registration entity 404, etc.). The message(s) sent by the trust-assigning entity 403 in step 858 may be the message(s) received by the registration entity 404 in step 822 of FIG. 8A.

If the identifying information is confirmed by the trust-assigning entity 403, the trust-assigning entity 403 may generate and send a cryptographically-unique token to the gateway 407 for storage (step 860). The trust-assigning entity 403 may also store data associating the token with the gateway 407 and/or the identifying information provided by the registration entity 404 (step 862).

The trust-assigning entity 403 may receive an acknowledgement of the token from the gateway 407 prior to, or in conjunction with, one or more subsequent service requests, such as a request to reconnect using the token (step 864). In step 866, after receipt of the reconnect request, the trust-assigning entity 403 may attempt to authenticate the identity of the gateway 407 based, at least in part, on the token received from the gateway 407 in step 864. If the trust-assigning entity 403 determines in step 866 that the identity of the gateway is not authenticated, trust-assigning entity 403 may in step 868 send one or more messages to the registration entity 404 that the authentication attempt failed such as, e.g., the message(s) received by the registration entity 404 in step 824 of FIG. 8A. The one or more messages sent in step 868 may also, or alternatively, state the reason for the failure. If the trust-assigning entity 403 determines in step 866 that the identity of the gateway is authenticated, in step 870, the trust-assigning entity 403 may send one or more messages to the registration entity 404 that indicate the gateway 407 is trusted and, therefore, authorized to obtain service in the network 402 such as, e.g., the message(s) received in step 824 of FIG. 8A. In step 872, the trust-assigning entity 403 may store and/or may cause other elements in the network 402 to store, data identifying the gateway 407 as authorized to obtain service in the network.

FIG. 8C is a flow chart showing an example method 880 performed by the gateway 407 in the system of FIG. 4. The gateway 407 may receive a request from the trust-assigning entity 403 requesting a list of devices that are currently connected to the gateway 407 (step 882). The request may be, e.g., the message(s) sent by the trust-assigning entity 404 in step 844 of FIG. 8B. The gateway 407 may, in step 884, query devices connected to the gateway 407 and prepare the list of currently connected devices. Also or alternatively, the gateway 407 may prepare the list of currently connected devices using a routing table and/or other data accessible to the gateway 407 based on being part of the local network in the premises 401. The gateway 407 may respond to the trust-assigning entity 403 with the list of currently connected devices (step 886).

If the registration entity 404 is not able to confirm the list of currently connected devices in step 818 of FIG. 8A and does not, therefore, send the request to the trust-assigning entity 403 to assign a token to the gateway 407, the gateway 407 may not receive any further messages from the trust-assigning entity 403 and the method of FIG. 8C may time out and terminate.

In step 888, the gateway 407 may receive a request from the trust-assigning entity 403, requesting the gateway 407 IP address and/or other identifying information. The request may be, e.g., the message(s) sent by the trust-assigning entity 403 in step 852 in FIG. 8B. In step 890, the gateway 407 may respond to the trust-assigning entity 403 with its IP address and/or other requested information). The gateway 407 may, in step 892, receive a cryptographically-unique token from the trust-assigning entity 403 for storage. After receiving the token, in step 894, the gateway 407 may send an acknowledgement and/or a request to reconnect to the trust-assigning entity 403 using the token.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. One or more non-transitory computer-readable media storing instructions that, when executed, cause:
   receiving, by a first computing device, via a second computing device, a request to establish trust for the second computing device in a network;
   determining, based on the request, a network address of the second computing device;
   verifying the network address of the second computing device;
   sending, based on the verifying the network address, an authentication token to the second computing device; and
   based on receipt of the authentication token in a communication from the second computing device, sending, by the first computing device and to a user device via the second computing device, a message confirming the second computing device is a trusted device.

2. The one or more non-transitory computer-readable media of claim 1, wherein the instructions, when executed, cause the verifying the network address of the second computing device by:
   sending, after the determining the network address, a confirmation message to the second computing device;
   receiving, after sending the confirmation message, a message from the second computing device; and
   determining an address in the message from the second computing device corresponds to the network address of the second computing device.

3. The one or more non-transitory computer-readable media of claim 1, wherein the instructions, when executed, cause the receipt of the authentication token in the communication from the second computing device by the receipt, from the second computing device and after the sending the authentication token to the second computing device, of a message comprising the authentication token and seeking reconnection to the network based on the authentication token.

4. The one or more non-transitory computer-readable media of claim 1, wherein the instructions, when executed, cause the verifying the network address of the second computing device and the sending the authentication token to the second computing device by sending websocket communications.

5. The one or more non-transitory computer-readable media of claim 1, wherein the instructions, when executed, cause receiving the request by receiving the request from the user device via the second computing device.

6. The one or more non-transitory computer-readable media of claim 1, wherein the instructions, when executed, further cause:
   receiving, from the user device via the second computing device, credentials associated with a user; and
   verifying the credentials, and wherein the verifying the network address of the second computing device is performed based on the verifying the credentials.

7. The one or more non-transitory computer-readable media of claim 6, wherein the instructions, when executed, further cause:
   sending, to a third computing device and based on the verifying the credentials, an authentication token assignment request, wherein the authentication token assignment request comprises the network address of the second computing device, and wherein the instructions, when executed, cause the verifying the network address of the second computing device and the sending the authentication token to the second computing device to be performed by the third computing device.

8. The one or more non-transitory computer-readable media of claim 1, wherein the second computing device comprises a gateway device.

9. One or more non-transitory computer-readable media storing instructions that, when executed, cause:
receiving, by a first computing device and from a user device via a wireless access point separate from a second computing device, a request to establish trust for the second computing device in a network;
sending, by the first computing device, to the user device, and after receiving the request to establish trust, a request for confirmation of one or more devices in communication with the second computing device;
receiving, from the user device after sending the request for confirmation, a confirmation that the one or more devices are in communication with the second computing device; and
causing, based on the receiving the confirmation, sending of an authentication token to the second computing device.

10. The one or more non-transitory computer-readable media of claim 9, wherein the instructions, when executed, further cause:
receiving, from the second computing device and after the causing the sending of the authentication token to the second computing device, a message seeking reconnection; and
sending, based on the receiving the message seeking reconnection, and to the user device, a message confirming the second computing device is a trusted device.

11. The one or more non-transitory computer-readable media of claim 9, wherein the instructions, when executed, cause the causing the sending of the authentication token by sending, to a third computing device, an authentication token assignment request.

12. The one or more non-transitory computer-readable media of claim 9, wherein the request for confirmation comprises information identifying the one or more devices in communication with the second computing device, and wherein the instructions, when executed, cause the sending the request for confirmation based on:
sending, to the second computing device and based on the request to establish trust, a request for information about devices in communication with the second computing device; and
receiving, from the second computing device after sending the request for information, indications of the one or more devices in communication with the second computing device.

13. A system comprising:
a first computing device; and
a second computing device,
wherein the first computing device is configured to:
receive, via the second computing device, a request to establish trust for the second computing device in a network;
determine, based on the request, a network address of the second computing device;
verify the network address of the second computing device;
send, based on the verifying the network address, an authentication token to the second computing device; and
based on receipt of the authentication token in a communication from the second computing device, send, to a user device via the second computing device, a message confirming the second computing device is a trusted device, and wherein the second computing device is configured to:
send, to the first computing device, the request to establish trust for the second computing device.

14. The system of claim 13, wherein the first computing device is configured to verify the network address of the second computing device by:
sending, after the determining the network address, a confirmation message to the second computing device;
receiving, after the sending the confirmation message, a message from the second computing device; and
determining an address in the message from the second computing device corresponds to the network address of the second computing device.

15. The system of claim 13, wherein the receipt of the authentication token in the communication from the second computing device comprises receipt, from the second computing device and after the sending the authentication token to the second computing device, of a message comprising the authentication token and seeking reconnection to the network based on the authentication token.

16. The system of claim 13, wherein the first computing device is configured to verify the network address of the second computing device and send the authentication token to the second computing device by sending websocket communications.

17. The system of claim 13, wherein the first computing device is configured to receive the request by receiving the request from the user device via the second computing device.

18. The system of claim 13, wherein the first computing device is further configured to:
receive, from the user device via the second computing device, credentials associated with a user; and
verify the credentials, and wherein the verifying the network address of the second computing device is performed based on the verifying the credentials.

19. The system of claim 18, wherein the first computing device is further configured to:
send, to a third computing device and based on the verifying the credentials, an authentication token assignment request, wherein the authentication token assignment request comprises the network address of the second computing device, and wherein first computing device is further configured to:
verify the network address of the second computing device and send the authentication token to the second computing device by causing the third computing device to verify the network address of the second computing device and send the authentication token to the second computing device.

20. The system of claim 13, wherein the second computing device comprises a gateway device.

21. A system comprising:

a first computing device; and a second computing device, wherein the first computing device is configured to:

receive, from a user device via a wireless access point separate from the second computing device, a request to establish trust for the second computing device in a network;

send, to the user device, and after receiving the request to establish trust, a request for confirmation of one or more devices in communication with the second computing device;

receive, from the user device after sending the request for confirmation, a confirmation that the one or more devices are in communication with the second computing device; and cause, based on the receiving the confirmation, sending of an authentication token to the second computing device, and wherein the second computing device is configured to:

receive the authentication token.

22. The system of claim 21, wherein the first computing device is further configured to:

receive, from the second computing device and after the causing the sending of the authentication token to the second computing device, a message seeking reconnection; and send, based on the receiving the message seeking reconnection, and to the user device, a message confirming the second computing device is a trusted device.

23. The system of claim 21, wherein the first computing device is configured to cause the sending of the authentication token by sending, to a third computing device, an authentication token assignment request.

24. The system of claim 21, wherein the request for confirmation comprises information identifying the one or more devices in communication with the second computing device, and wherein the first computing device is configured to send the request for confirmation based on:

sending, to the second computing device and based on the request to establish trust, a request for information about devices in communication with the second computing device; and receiving, from the second computing device after sending the request for information, indications of the one or more devices in communication with the second computing device.

\* \* \* \* \*

UNITED STATES PATENT AND TRADEMARK OFFICE
CERTIFICATE OF CORRECTION

| | | |
|---|---|---|
| PATENT NO. | : 11,805,113 B2 | Page 1 of 1 |
| APPLICATION NO. | : 17/858708 | |
| DATED | : October 31, 2023 | |
| INVENTOR(S) | : Chan et al. | |

It is certified that error appears in the above-identified patent and that said Letters Patent is hereby corrected as shown below:

In the Specification

Column 15, Line 48:
Delete "403" and insert --404--

Column 17, Line 35:
Delete "404" and insert --403--

Signed and Sealed this
Twenty-second Day of October, 2024

*Katherine Kelly Vidal*

Katherine Kelly Vidal
*Director of the United States Patent and Trademark Office*